United States Patent [19]

Mizokami

[11] 4,295,718

[45] Oct. 20, 1981

[54] EXPOSURE CONTROL CIRCUIT OF CAMERA

[75] Inventor: Kazunori Mizokami, Hachioji, Japan

[73] Assignee: Olympus Optical Company Ltd., Japan

[21] Appl. No.: 109,763

[22] Filed: Jan. 7, 1980

[30] Foreign Application Priority Data

Mar. 2, 1979 [JP] Japan .................. 54/24147

[51] Int. Cl.³ .......................................... G03B 7/081
[52] U.S. Cl. ................................ 354/50; 354/60 R
[58] Field of Search ............ 354/23 R, 50, 51, 60 R; 250/214 P

[56] References Cited

U.S. PATENT DOCUMENTS 4,099,115 7/1978 Watanabe ................ 354/60 R X
4,107,707 8/1978 Wumata et al. ........... 354/60 R X

FOREIGN PATENT DOCUMENTS 54-15626 3/1979 Japan .

Primary Examiner—Michael L. Gellner
Attorney, Agent, or Firm—Ostrolenk, Faber, Gerb & Soffen

[57] ABSTRACT

An exposure control circuit for camera comprises a photoelectric transducer element which produces an integrated voltage by the photometry of light from an object being photographed. A trigger signal is applied to the transducer element by a trigger switch which is preferably constructed as a semiconductor switch circuit. The trigger switch is connected, through a potential equalizing switch or resistor, between the non-inverting input terminal and the output terminal of an operational amplifier which is arranged to operate as a voltage follower to derive an output voltage equal to the integrated voltage.

11 Claims, 4 Drawing Figures

EXPOSURE CONTROL CIRCUIT OF CAMERA

BACKGROUND OF THE INVENTION

The invention relates to an exposure control circuit of a camera, and more particularly, to such circuit which uses an analog semiconductor switch as a trigger switch for the exposure control circuit.

As is recognized, an exposure control circuit of a camera utilizes a photoelectric transducer element such as a silicon photodiode in order to derive a photocurrent which is proportional to the magnitude of light from an object being photographed. The photocurrent is then converted into a integrated voltage, which is then compared against a reference voltage to determine an exposure period in accordance with the intensity of the light from an object being photographed.

As a refinement, an output voltage from the silicon photodiode may be applied to an operational amplifier having a high input impedance in order to derive an integrated voltage which is free from the influences of other peripheral circuits. An exposure control circuit thus formed is driven by a trigger switch which is operated in connection with a shutter release operation of a camera.

The trigger switch which triggers the exposure control circuit of the camera heretofore comprises a switch having mechanical contacts which are disadvantageously subject to deterioration of their insulation or to poor contact in a high temperature or high humidity environment. It should be noted that an exposure control circuit which comprises a silicon photodiode and an operational amplifier is generally very sensitive and can be influenced by a leakage current of a very small magnitude. Hence, a very precise design, i.e. one having, for example, a very close tolerance against leakage current, as well as a very effective insulation, is required. Finally, the trigger switch must be fully capable of turning a very small current on and off.

However, a switch utilizing mechanical contacts cannot meet these requirements. In a high temperature or high humidity environment, the insulation may be degraded or the resistance of contact of mechanical contacts may increase, causing a poor contact which in turn results in variations in the accuracy of the automatic exposure of the camera with varying environment. In addition, the trigger switch utilizing mechanical contacts incorporates an expensive ceramic printed board, resulting in the complexity of the construction and a high cost.

To overcome the described disadvantages of the trigger switch which utilizes mechanical contacts, there has been a proposal to use a semiconductor switch such as a CMOS transmission gate switch employing a CMOS transistor, for example, as the trigger switch. While the use of such switch avoids the disadvantages of the trigger switch utilizing the mechanical contacts, the insulating resistance across the switch when it is turned off is low as compared with the resistance of the corresponding mechanical switch, so that a leakage current may flow through the switch. Such leakage current prevents a reliable operation of the exposure control circuit.

SUMMARY OF THE INVENTION

It is an object of the invention to eliminate the disadvantages of the prior art by providing an exposure control circuit for a camera which utilizes a semiconductor switch circuit as a trigger switch for enabling a photoelectric transducer element, operable to determine light from an object being photographed, to develop an integrated voltage by cooperation with an operational amplifier. The output voltage of the amplifier is applied to the trigger switch through another potential equalizing switch, thus preventing any leakage current from flowing through the trigger switch.

In accordance with the invention, the trigger switch is connected across the output terminal and non-inverting input terminal of an operational amplifier through another potential equalizing switch. The operational amplifier operates as a voltage follower. In this manner, the same potential is maintained across the trigger switch. Hence, when the trigger switch is off, there is no flow of a leakage current therethrough. In this manner, an integrated voltage formed within the exposure control circuit is made independent from the off resistance of the trigger switch, enabling a correct determination of an exposure period.

DESCRIPTION OF PREFERRED EMBODIMENTS

Figure 1:
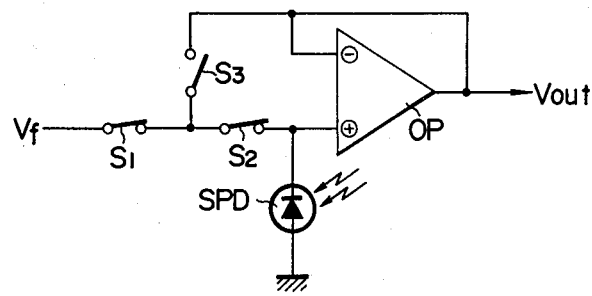
FIG. 1 is a circuit diagram of an exposure control circuit for camera according to one embodiment of the invention.

Referring to FIG. 1, there is shown an exposure control circuit according to one embodiment of the invention. The circuit comprises a photometric, photoelectric transducer element SPD, an operational amplifier OP, a pair of series connected trigger switches $S_1$ and $S_2$, and a potential equalizing switch $S_3$.

The photoelectric transducer element SPD comprises a silicon photodiode which receives part of the light from an object being photographed which impinges on a film surface through a lens of the camera, the element producing an electrical signal or a photocurrent in proportion to the intensity of the light input. The transducer element SPD has its cathode connected with the non-inverting input terminal of the operational amplifier OP and its anode connected with the ground. The operational amplifier OP comprises a conventional operational amplifier and has the characteristic that its input resistance has a magnitude of infinity. In this manner, a photocurrent which is produced by the transducer element in proportion to the amount of light from an object being photographed is derived as an output voltage which is free from the influences of other circuits. The purpose of the pair of series connected trigger switches $S_1$, $S_2$ is to apply a reference voltage $V_f$ to the non-inverting input terminal of the operational amplifier and to the cathode of the transducer element SPD. These trigger switches $S_1$, $S_2$ are normally closed as shown, but are opened in response to the depression of a shutter release member of the camera. The potential equalizing switch $S_3$ has its one end connected with the junction between the trigger switches $S_1$ and $S_2$ and its other end connected to the inverting input terminal of the operational amplifier OP. The switch $S_3$ is normally open, but is closed whenever the trigger switches $S_1$, $S_2$ are opened, thus supplying the output voltage of the operational amplifier to the junction between the switches $S_1$ and $S_2$.

Figure 3:
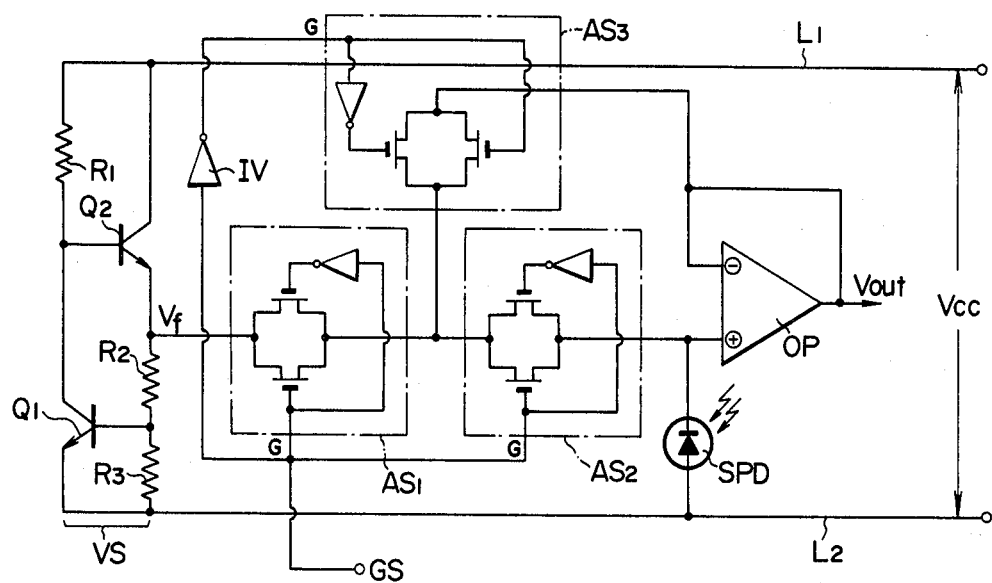
FIG. 3 is a detailed circuit diagram of the circuit shown in FIG. 1.

While the switches $S_1$, $S_2$ and $S_3$ are shown as mechanical switches, it should be understood that they comprise semiconductor switches, such as CMOS analog switches, for example, as illustrated in FIG. 3.

In operation, before the shutter release member of the camera is depressed, the trigger switches $S_1$, $S_2$ remain closed while the switch $S_3$ is open. Under this condition, the reference voltage $V_f$ is applied through the trigger switches $S_1$, $S_2$ to the cathode of the transducer element SPD. The transducer element SPD generally has a junction capacitance across its junction, so that the reference voltage $V_f$ is charged across the junction capacitance as an integrated voltage. Simultaneously, the reference voltage $V_f$ is applied to the non-inverting input terminal of the operational amplifier OP. Under this condition, the output voltage, Vout, of the amplifier is equal to the reference voltage $V_f$ because of the nature of the operational amplifier that a potential difference across the non-inverting and the inverting input terminal thereof remains zero. Subsequently, when the shutter release member of the camera is depressed to open the trigger switches $S_1$, $S_2$, the reference voltage $V_f$ ceases to be applied to the non-inverting input terminal of the operational amplifier OP and to the cathode of the transducer element SPD. On the other hand, the shutter of the camera is opened in response to the depression of the release member, whereby light from an object being photographed impinges upon the transducer element SPD through the lens of the camera. In response thereto, the transducer element SPD produces a photocurrent which flows to the junction capacitance. Since the junction capacitor has been charged by the reference voltage $V_f$, it will be appreciated that the voltage thereacross begins to decrease gradually from the value of the reference voltage $V_f$ as the photocurrent begins to flow. Since the voltage is also applied to the non-inverting input terminal of the operational amplifier, the output voltage of the amplifier begins to decrease gradually in the same manner as the voltage across the junction capacitance decreases gradually.

When the voltage across the transducer element SPD gradually decreases from the value of the reference voltage $V_f$ in this manner, it will be seen that a potential difference is developed between this voltage and the reference voltage $V_f$, which potential difference is apparently applied across the trigger switches $S_1$ and $S_2$. In the present embodiment, the trigger switches $S_1$ and $S_2$ are formed by semiconductor switches such as CMOS analog switches, which have the disadvantage that their off impedance is relatively low. Hence, when the aforementioned potential difference is applied across the trigger switches $S_1$, $S_2$, there is a flow of a leakage current through the off impedance which has a relatively low magnitude. The leakage current obviously flows from the higher reference voltage $V_f$ toward the junction capacitance through the trigger switches $S_1$, $S_2$, with consequence that the voltage across the junction capacitance will increase slightly by an amount attributable to the leakage current. It is recognized that this error current flow or leakage current results in the error in an exposure period which is determined by the photometric circuit.

In the above description, the presence of the potential equalizing switch $S_3$ has been neglected. In accordance with the invention, the switch $S_3$ operates as follows: The switch $S_3$ supplies the output voltage of the operational amplifier OP to the junction between the trigger switches $S_1$ and $S_2$, as mentioned previously. Since the output voltage Vout of the operational amplifier is the same as the voltage developed across the junction capacitance of the transducer element SPD, the closure of the switch $S_3$ causes the same potential to be applied to the opposite terminals of the trigger switch $S_2$. In other words, no potential difference is developed across the trigger switch $S_2$. This means that there is no flow of any leakage current through the trigger switch $S_2$, avoiding any influence upon the voltage across the junction capacitance of the transducer element SPD. This is true if the photocurrent from the transducer element SPD causes the voltage across the junction capacitance to be reduced in a gradual manner to create a potential difference with respect to the reference voltage $V_f$.

Figure 2:
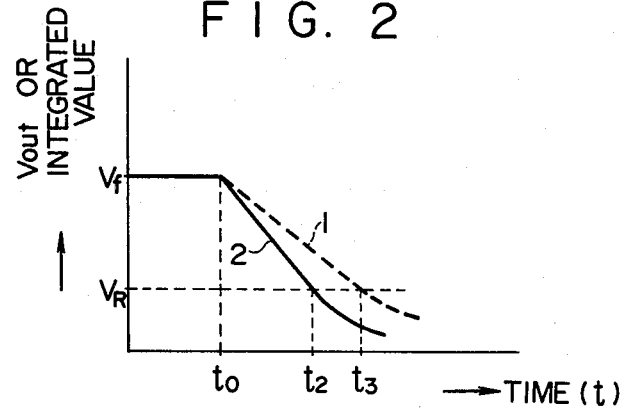
FIG. 2 graphically shows the output voltage of the circuit shown in FIG. 1.

FIG. 2 graphically shows the output voltage Vout of the operational amplifier OP, which is equal to the integrated voltage across the junction capacitance, shown on the ordinate, plotted against the time on the abscissa. A curve 1 shown as a dotted line represents the integrated voltage in the absence of the potential equalizing switch $S_3$ while a curve 2 shown in solid line represents the integrated voltage when the switch $S_3$ is provided. At time $t_0$, the shutter release member of the camera is depressed. As indicated by the curves 1, 2, the integrated voltage begins to decrease gradually at time $t_0$. It will be appreciated from the curves 1, 2 shown in FIG. 2 that an error voltage corresponding to the difference between the curves 1 and 2, occasioned by the leakage current through the trigger switches $S_1$ and $S_2$ which causes the voltage across the junction capacitance to increase, is removed by the provision of the potential equalizing switch $S_3$. Specifically, representing a reference voltage by VR against which the integrated voltage is compared in order to determine the exposure period, these curves will intersect with the level of the reference voltage VR at times $t_3$ and $t_2$, respectively. The difference in time $t_3 - t_2$ represents an error in the exposure period. As mentioned previously, the provision of the switch $S_3$ according to the invention eliminates this error.

FIG. 3 shows a specific circuit arrangement which implements the circuit of FIG. 1. It should be understood that the electrical circuit shown in FIG. 3 is completely identical with the circuit of FIG. 1 in the functional sense and except that the trigger switches $S_1$, $S_2$ and the potential equalizing switch $S_3$ are replaced by CMOS analog switches $AS_1$, $AS_2$, $AS_3$, respectively, which are formed by CMOS transmission switches, and that a specific circuit VS is shown which generates the reference voltage $V_f$. In addition, an inverter IV is connected between the analog switches $AS_1$ and $AS_2$ on one hand and the analog switch $AS_3$ on the other in order to turn the analog switches $AS_1$ and $AS_2$ on when the analog switch $AS_3$ is off or vice versa. In other respects, the arrangement is similar to FIG. 1. The construction and operation of the analog switches $AS_1$, $AS_2$, $AS_3$ are well known in the art, and therefore will not be described in detail. However, briefly describing one of these switches with reference to FIG. 3, it includes a PMOS transistor and an NMOS transistor connected in parallel. The gate of one of these transistors, for example, the PMOS transistor is fed with a gate signal which is opposite to the signal supplied to the gate of the other transistor. At this end, an inverter is provided. It will be seen that the sources and collectors of both PMOS and NMOS transistors are connected in common, and represent the opposite terminals of the switch. A lead wire is connected to the gate of one transistor directly, and to the gate of the other transistor through the inverter. When a high level signal is applied to the gate, both the PMOS and the NMOS transistors are turned on, establishing a conductive state of the switch. On the other hand, when a low level signal is applied to the gate, the transistors are turned off, representing an open circuit condition of the switch.

The gates G of the analog switches $AS_1$ and $AS_2$ are connected together and a gate signal GS is applied thereto. The gate signal GS is also applied to the input terminal of the inverter IV, the inverted output signal of which is applied to the gate G of the analog switch $AS_3$. A supply voltage Vcc is applied across a pair of lines $L_1$ and $L_2$, across which the circuit VS for producing the reference voltage is connected. The circuit VS comprises a series circuit of a resistor $R_1$ and a transistor $Q_1$ connected across the lines $L_1$ and $L_2$, and another series circuit including a transistor $Q_2$ and resistors $R_2$ and $R_3$ connected in series across the lines $L_1$ and $L_2$. The base of the transistor $Q_1$ is connected to the junction between the resistors $R_2$ and $R_3$ while the base of the transistor $Q_2$ is connected to the junction between the resistor $R_1$ and the transistor $Q_1$. The reference voltage $V_f$ is derived from the junction between the emitter of the transistor $Q_2$ and the resistor $R_2$, and is supplied to the analog switch $AS_2$ and also through the analog switches $AS_1$ and $AS_2$ to the non-inverting input terminal of the operational amplifier OP. The photoelectric transducer element SPD has its cathode connected to the non-inverting input terminal of the operational amplifier OP as before, and its anode connected with the line $L_2$. The output terminal of the operational amplifier OP is connected with the inverting input terminal thereof, and is also connected to the potential equalizing analog switch $AS_3$, and thence to the junction of analog switches $AS_1$ and $AS_2$.

It should be emphasized again that the circuit of FIG. 3 is essentially the same as the circuit shown in FIG. 1, the only difference being that the switches of FIG. 1 are replaced by the analog switches. Under normal condition, the gate signal GS assumes a high level, so that the analog switches $AS_1$ and $AS_2$ are both turned on. Accordingly, the reference voltage $V_f$ produced by the circuit VS is applied through the analog switches $AS_1$ and $AS_2$ to charge the junction capacitance of the transducer element SPD, and also to be applied to the non-inverting input terminal of the operational amplifier OP. The gate signal GS is inverted by the inverter IV before it is applied to the potential equalizing analog switch $AS_3$, so that this switch remains off. When the shutter release member of the camera is now depressed, the gate signal GS changes from its high to its low level. Consequently, both analog switches $AS_1$ and $AS_2$ are turned off, and the reference voltage $V_f$ ceases to be applied to the transducer element SPD and the operational amplifier OP. Simultaneously, light from an object being photographed impinges on the transducer element SPD through the taking lens of the camera since the shutter is opening, thus initiating the photometry. Then the voltage across the transducer element SPD begins to decrease gradually from time $t_0$ as shown in FIG. 2. But for the switch $S_3$, there would be a flow of a leakage current through the analog switches $AS_1$, $AS_2$, causing an error in the voltage across the junction capacitance of the element SPD, as indicated by the curve 1 shown in FIG. 2, inasmuch as the analog switches $AS_1$, $AS_2$ have a relatively low off resistance which may be on the order of 100 M$\Omega$.

However, as mentioned previously, the provision of the analog switch $AS_3$ prevents the occurrence of such an error. Specifically, the gate signal GS which now assumes the low level is converted to a high level by the inverter IV before it is applied to the gate G of the analog switch $AS_3$. Hence the switch $AS_3$ is turned on. The output voltage Vout of the operational amplifier OP is then applied to the junction between the analog switches $AS_1$ and $AS_2$ through the conducting analog switch $AS_3$. As a consequence, zero potential is maintained across the analog switch $AS_2$, which prevents any flow of a leakage current therethrough. In this manner, the voltage across the junction capacitance of the transducer element SPD is free from any influence of such leakage current as is the output voltage of the operational amplifier OP.

Figure 4:
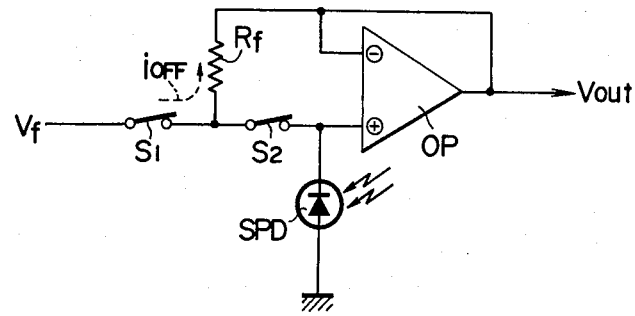
FIG. 4 is a circuit diagram of an exposure control circuit for camera according to another embodiment of the invention.

FIG. 4 shows another embodiment of the invention. In this circuit, the potential equalizing switch $S_3$ is replaced by a resistor Rf. In other respects, the arrangement is similar to that shown in FIG. 1, and hence will not be described again.

The potential equalizing resistor Rf has a relatively high resistance on the order of 1 M$\Omega$, and continually applies the output voltage of the operational amplifier OP to the junction between the trigger switches $S_1$ and $S_2$.

When the trigger switches $S_1$ and $S_2$ are off and the photometry is performed by the transducer element SPD to cause a gradual decrease in the voltage across the junction capacitance, the resistor Rf serves to supply the output voltage of the operational amplifier OP to the junction between the trigger switches $S_1$ and $S_2$ in order to avoid any adverse influence upon the voltage across the junction capacitance by a leakage current which may flow through the off resistance of the trigger switch $S_2$. In this manner, the resistor Rf removes any potential difference across the trigger switch $S_2$, eliminating a flow of a leakage current through the trigger switch $S_2$.

In this instance, it may appear that a current $i_{OFF}$ which flows through the trigger switch $S_1$ from the reference voltage $V_f$ to the resistor Rf as indicated in phantom line in FIG. 4, when the trigger switches $S_1$ and $S_2$ remain off, would develop a voltage drop across the resistor Rf to cause an influence upon the potential at the junction between the trigger switches $S_1$ and $S_2$. However, in practice, the off resistance of these trigger switches $S_1$ and $S_2$ is on the order of 100 M$\Omega$, so that the voltage drop across the resistor Rf, produced by the flow of the current $i_{OFF}$, is substantially negligible. This is because the off resistance of the trigger switches is by a few orders of magnitude greater than the resistance of the resistor When the trigger switches $S_1$ and $S_2$ are turned on, the reference voltage $V_f$ is applied through these switches to charge the junction capacitance of the transducer element SPD to maintain the same potential across the resistor Rf, so that there is no current flow through this resistor, presenting no problem whatsoever.

What is claimed is:

1. An exposure control circuit for a camera, comprising:
    a photoelectric transducer element for determining the amount of light being received by a camera containing said transducer element from an object being photographed, and for generating a current proportional to the amount of said light;
    an operational amplifier having its non-inverting input terminal connected to said transducer element and its output terminal coupled to its inverting input terminal for generating an output voltage representative of the integral of said current when an object is being photographed;
    a first trigger switch comprising semiconductor switch means of the type which is capable of exhibiting a leakage current when the voltage across first and second terminals of said switch means is other than zero, said first terminal of said switch means being connected to said non-inverting input terminal of said operational amplifier and to said transducer element for applying a trigger signal to said transducer element which enables said transducer element to produce said current when an object is being photographed; and
    potential equalizing means for maintaining said second terminal of said trigger switch at said output voltage of said operational amplifier at all times while said transducer element is generating said current, thereby to apply a zero voltage drop across said trigger switch and eliminate the flow of leakage current therethrough.

2. An exposure control circuit according to claim 1, in which
    said semiconductor means comprises a CMOS analog switch circuit.

3. An exposure control circuit according to claim 1, further comprising
    a second trigger switch connected in series with said first trigger switch at a junction, said potential equalizing means being connected at said junction, between said first and second trigger switches.

4. An exposure control circuit according to claim 3, in which
    each of said first and said second trigger switches comprises a CMOS analog switch circuit.

5. An exposure control circuit according to claim 1, in which
    said photoelectric transducer element comprises a silicon photodiode.

6. An exposure control circuit according to any one of claims 1-5, in which said potential equalizing means comprises a resistor.

7. An exposure control circuit according to claim 1, in which said potential equalizing means is connected between the output terminal of said operational amplifier and said other end of said first trigger switch.

8. An exposure control circuit according to claim 1, in which said potential equalizing means comprises switch means.

9. An exposure control circuit according to claim 8, in which said switch means comprises a CMOS analog switch circuit.

10. An exposure control circuit according to claim 8, in which said switch means comprises a semiconductor switch.

11. An exposure control circuit for a camera, comprising:
    first circuit means, including photoelectric transducer means, for generating a signal representative of the amount of light being received from an object being photographed by a camera containing said exposure control circuit, said representative signal being applied to a first junction and controlling the shutter of said camera;
    second circuit means for generating a fixed voltage signal which disables said photoelectric transducer means whenever no object is being photographed by said camera, said second circuit means comprising first switch means which is connected in series between a second junction and said first circuit means and which is operable in an open condition when an object is being photographed and in a closed condition when no object is being photographed, said switch means being of a type that is capable of producing a leakage current when the voltage thereacross is not zero; and
    third circuit means for maintaining said second junction at the same voltage as the voltage of said representative signal when an object is being photographed, said third circuit means including second switch means connected in series with said first switch means at said second junction and being operable in an open condition when an object is being photographed and in a closed position when no object is being photographed.

* * * * *